US009924150B2

(12) United States Patent
Huang et al.

(10) Patent No.: US 9,924,150 B2
(45) Date of Patent: Mar. 20, 2018

(54) TECHNIQUES FOR STEREO THREE DIMENSIONAL VIDEO PROCESSING (71) Applicant: INTEL CORPORATION, Santa Clara, CA (US)

(72) Inventors: Chao Huang, Shanghai (CN); Manuj Sabharwal, Folsom, CA (US)

(73) Assignee: INTEL CORPORATION, Santa Clara, CA (US)

(*) Notice: Subject to any disclaimer, the term of this patent is extended or adjusted under 35 U.S.C. 154(b) by 777 days.

(21) Appl. No.: 14/373,451

(22) PCT Filed: Dec. 24, 2013

(86) PCT No.: PCT/CN2013/090275
§ 371 (c)(1),
(2) Date: Jul. 21, 2014

(87) PCT Pub. No.: WO2015/096019
PCT Pub. Date: Jul. 2, 2015

(65) Prior Publication Data
US 2015/0229902 A1    Aug. 13, 2015

(51) Int. Cl.
*H04N 13/00* (2006.01)
*H04N 19/172* (2014.01)
(Continued)

(52) U.S. Cl.
CPC ..... *H04N 13/0022* (2013.01); *H04N 13/0048* (2013.01); *H04N 13/025* (2013.01);
(Continued)

(58) Field of Classification Search
CPC .......... H04N 13/0022; H04N 13/0048; H04N 13/0055; H04N 19/182; H04N 1319/597; H04N 19/172
See application file for complete search history.

(56) References Cited

U.S. PATENT DOCUMENTS 9,219,911 B2    12/2015   Ushiki et al.
9,307,228 B2    4/2016    Chen et al.
(Continued)

FOREIGN PATENT DOCUMENTS

CN    1448029 A    10/2003

OTHER PUBLICATIONS

International Search Report and Written Opinion received for PCT Patent Application No. PCT/CN2013/090275, dated Jul. 8, 2014, 13 pages.

(Continued)

*Primary Examiner* — Huy T Nguyen (57) ABSTRACT

An apparatus for processing a stereo three dimensional video includes a memory to store an encoded stereo three dimensional (S3D) video frame of the stereo three dimensional video, where the S3D video frame comprising a left frame, right frame, and depth frame. The apparatus may include a processor to retrieve a pixel (x,y) of the depth frame, the pixel (x,y) comprising a reference device depth (x,y). The apparatus may also include a device aware decoder component to determine pixel pair positions for a left pixel in the left frame and right pixel in the right frame based upon the pixel (x,y), and to calculate a target device disparity for the pixel (x,y), based upon the reference device depth(x,y) and a screen size of a target device to present the S3D video.

22 Claims, 8 Drawing Sheets

(51) Int. Cl.
    *H04N 13/02*     (2006.01)
    *H04N 19/182*     (2014.01)
    *H04N 19/597*     (2014.01)

(52) U.S. Cl.
    CPC ......... *H04N 19/172* (2014.11); *H04N 19/182* (2014.11); *H04N 19/597* (2014.11); *H04N 13/0055* (2013.01)

(56) References Cited

U.S. PATENT DOCUMENTS

| | | |
|---|---|---|
| 2010/0039504 A1 | 2/2010 | Takahashi et al. |
| 2010/0103249 A1 | 4/2010 | Lipton et al. |
| 2011/0254925 A1 | 10/2011 | Ushiki et al. |
| 2011/0279647 A1 | 11/2011 | Nishimura et al. |
| 2011/0304618 A1 | 12/2011 | Chen et al. |
| 2012/0139910 A1 | 6/2012 | Lee et al. |
| 2012/0327200 A1* | 12/2012 | Takahashi .......... G02B 27/0025 348/54 |

OTHER PUBLICATIONS

Office Action and Search Report received for Chinese Patent Application No. 201380081156.0, dated Mar. 2, 2017, 7 pages.
Extended European Search Report received for European Patent Application No. 13900580.5, dated Jul. 19, 2017, 10 pages.

* cited by examiner

TECHNIQUES FOR STEREO THREE DIMENSIONAL VIDEO PROCESSING

TECHNICAL FIELD

The present embodiments are related to three dimensional (3D) digital media and in particular to decoding 3D video for presentation on display devices.

BACKGROUND

Recently the use of stereo 3D to view games and videos has become increasingly popular. Stereo 3D devices such as 3D projectors, 3D TVs and so on are widely used for watching movies, stereo 3D TV programs and other stereo 3D videos. However, users do not have the same experience when watching the same stereo 3D video on different devices when screen size varies between devices. For example, the user experience is different when a user watches a stereo 3D video designed for a 64 inch screen on a 32 inch screen instead of the designed-for 64 inch screen. Assuming that the expected viewing distance for 64 inch screen is 4 meters and the expected viewing distance for 32 inch screen is 2 meters, in present day design the presentation of stereo 3D videos is such that the perceived depth range for a 32 inch screen is much smaller than that for a 64 inch screen. For example, although a 32 inch screen is exactly half the dimension of a 64 inch screen, when a stereo 3D video designed for the 64 inch screen is displayed on the 32 inch screen the perceived depth range may be much less than half of the perceived depth range experienced when watching the stereo 3D on a 64 inch screen. For example, the perceived depth range on the 32 inch screen may be less than ¼ that of the perceived depth range on a 64 inch screen.

This large degradation in the ability to present depth in a stereo 3D video when screen size of a viewing device is smaller than that of the designed device limits the quality of experience for many users since stereo 3D videos may be deployed on multiple different device types. Moreover, this may limit the growth of stereo 3D video because of the need to custom design the stereo 3D video for different device screen sizes.

DETAILED DESCRIPTION

Embodiments provide enhancements for the viewing of stereoscopic 3D (S3D) video when presented on digital display devices in which screen size, among other properties, may vary. In particular embodiments, real time encoding and decoding of video data is handled in a manner that provides device aware video processing as detailed below. As noted, due to the proliferation of display device models with a large range of screen sizes and expected viewer distances, techniques for processing stereo videos are needed that can accommodate differences in screen sizes and still produce an acceptable perceived depth appropriate for the device presenting the video, which is referred to herein as the "target device." The present embodiments address this issue by changing disparity to accommodate differences in size of target devices during decoding of a video in real-time. In this manner a single S3D video may be deployed over multiple different devices having a range of screen sizes where the perceived depth produces an enjoyable user experience independent of device size.

In the present embodiments, novel operations are performed by a decoding system that takes into account the characteristics of the device to present an S3D video. The techniques and components that perform such operations are termed herein "device aware" because of this feature of adjusting video encoding to account for screen size of a device to which the encoded video is to be transmitted. A result of operation of the present embodiments is the reduction in viewer's distortion that may be caused by unsuitable compression in perceived depth for a given S3D video.

In various embodiments a component such as a video decoder or codec (encoder/decoder) is provided to perform or assist in the performing of device aware S3D decoding. The device aware S3D decoding may be provided as part of an implementation framework that includes novel S3D video recording and processing as detailed below.

Figure 1:
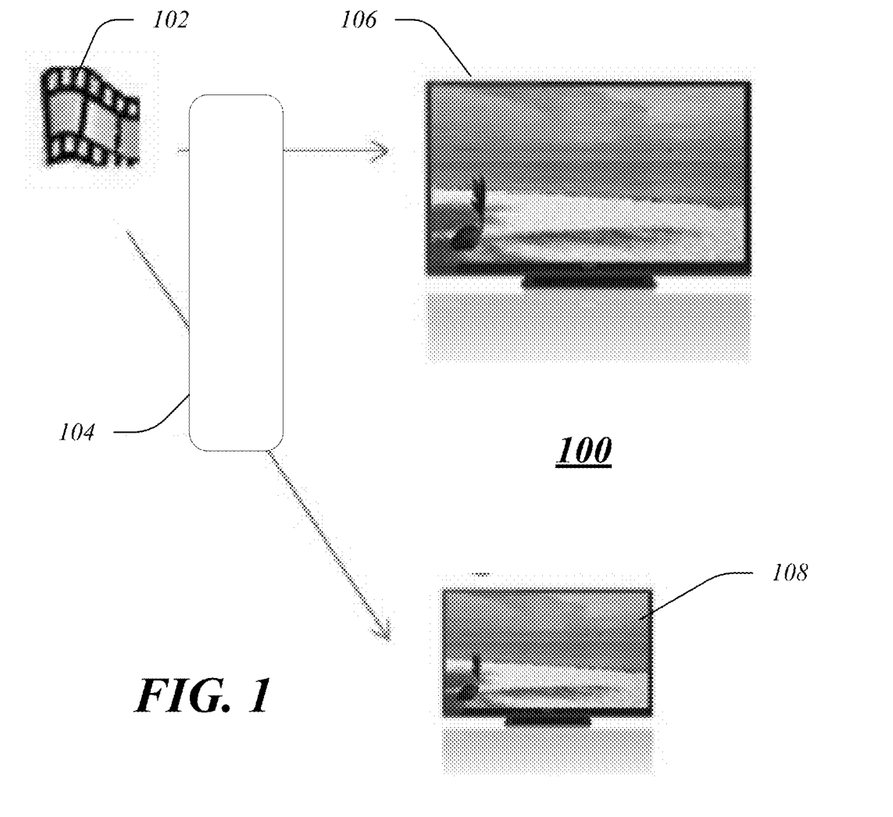
FIG. 1 depicts an exemplary implementation architecture for stereo three dimensional video processing.

FIG. 1 depicts an implementation architecture for processing S3D content in accordance with embodiments of the disclosure. The architecture 100 includes various components to process an S3D video 102. As detailed below in various embodiments the S3D video may be video content that is generated in a manner that provides information to facilitate device aware S3D treatment of the S3D video. This has the effect of enhancing user experience when the S3D video is deployed for viewing across multiple different device platforms. In particular, the S3D video may be recorded and encoded to permit viewing on devices having multiple different screen sizes in which perceived depth of objects is adjusted to account for different screen dimensions. The S3D video 102 may be forwarded to a device aware decoder system 104 whose operation is detailed below. In one implementation, the S3D video 102 may be forwarded to a device 106 that includes a digital display having a screen size having a first dimension. In one example, the S3D video 102 may be encoded in a manner that is designed for presentation of the S3D video 102 on devices having screen sizes of the first dimension. Thus the device 106 may be termed a reference device.

As further shown in FIG. 1, the S3D video 102 may be processed by the device aware decoder system 104 and forwarded to a second device, device 108, whose screen size differs from that of device 106. The device aware decoder system 104 may include components that decode the S3D video 102 to adjust its video frames so that perceived depth of objects in the video frames are appropriate for the device 108. In various implementations as detailed below, this may allow a larger perceived depth to be preserved as compared to conventional video codecs when the S3D video 102 is provided to devices having smaller screen size.

Figure 2:
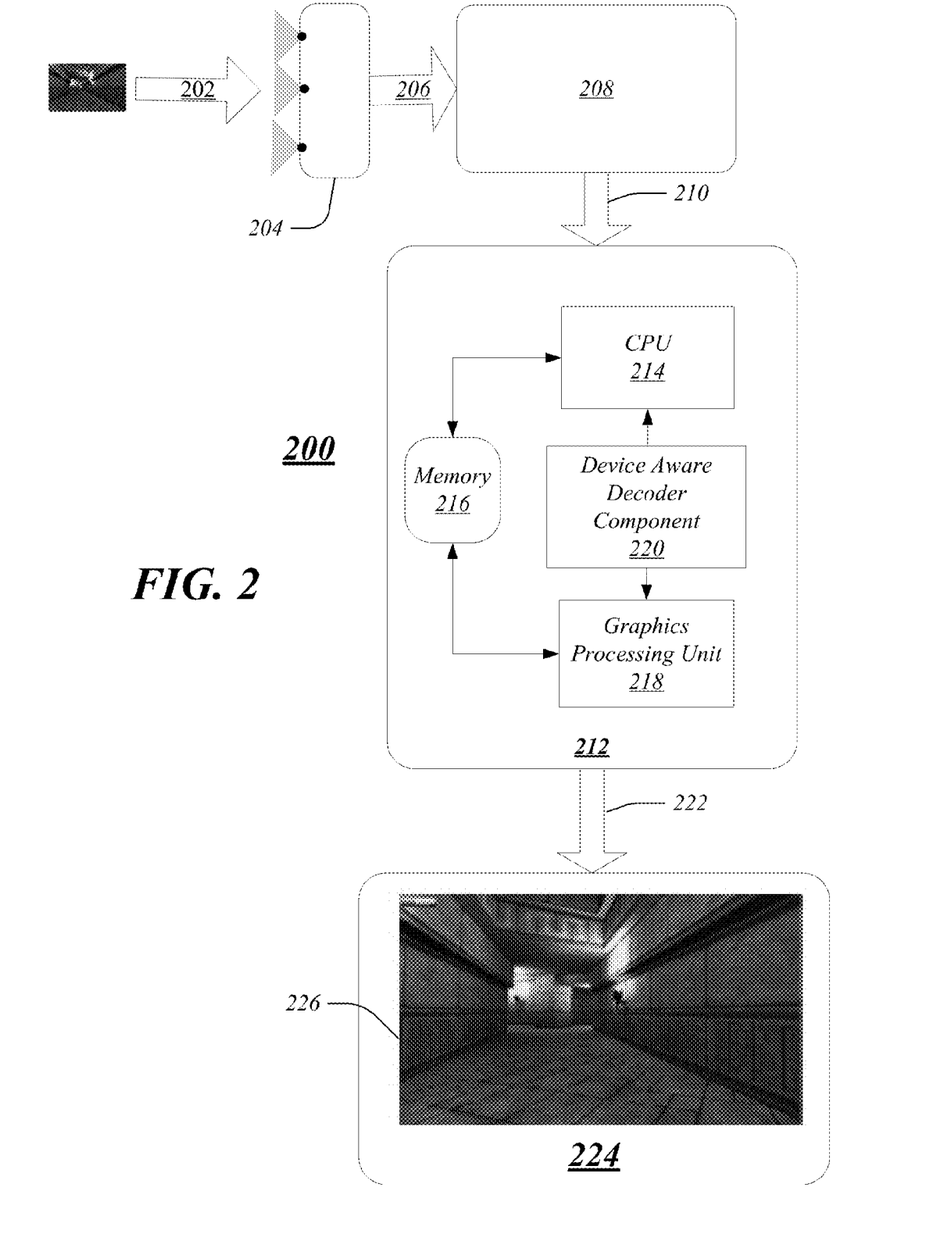
FIG. 2 depicts a processing scenario and apparatus consistent with the present embodiments.

FIG. 2 presents an exemplary processing scenario 200 for S3D video consistent with various embodiments. In this scenario video content 202 is recorded by a video recording device 204. In various embodiments, the video recording device 204 includes left camera, right camera, and depth camera, whose operation is detailed below. The video content may be stored or transmitted to another device as S3D video 206. The S3D video 206 may be stored in any location and any convenient device, which is indicated as a video source 208. In one use scenario, the video source 208 is configured to stream the S3D video 206 as a streaming S3D video 210. The streaming S3D video 210 may in one example be designed for presentation on a device having a 64 inch screen. However, in some instances the streaming S3D video 210 may be provided to a user for presentation on a device having a smaller screen, such as a 32 inch screen. In the scenario of FIG. 2 a device aware decoder system 212 is provided to decode the streaming S3D video 210 in a manner that accounts for characteristics of the device to present the streaming S3D video 210. In particular, the device aware decoder system 212 may decode the streaming S3D video 210 to account for the screen size of a display device 224 to which the streaming S3D video 210 is to be sent. The device that is to receive decoded video from a device aware decoder system is generally referred to herein as a "target device."

The device aware decoder system 212 may include a general processor, shown as CPU 214, a memory 216, a graphics processing unit. When video is streamed to the device aware decoder system 212, the memory 216 may store frames of an encoded S3D video such as the streaming S3D video 210. The streaming S3D video 310 may be retrieved from memory 216 by a processor such as the CPU 214 or graphics processing unit 218 for processing.

The device aware decoder system 212 may also include a device aware decoder component 220 whose function is detailed with respect to the FIGS. to follow. The device aware decoder component 220 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. In particular embodiments, the device aware decoder component 220 may be incorporated at least in part in a video codec that is located in a platform the contains the display device 224. However, in other embodiments, the device aware decoder component 220 and device aware encoding system may be located in a different platform than that containing the display device 224.

In the example of FIG. 2, the device aware decoder system 212 is configured to output the received streaming S3D video 210 as the decoded S3D video 222. As detailed below, the decoding of the streaming S3D video 210 takes place in a manner that formats left and right frames of each video frame of the decoded S3D video 222 to generate an on screen disparity that produces a desired perceived depth in object of the streaming S3D video 210. In some embodiments, and as detailed below, the device aware decoder g system 212 may operate to maintain a constant ratio of perceived object depth/screen width when the S3D decoded video 226 is presented on different devices of differing screen size including different screen width.

Figure 3:
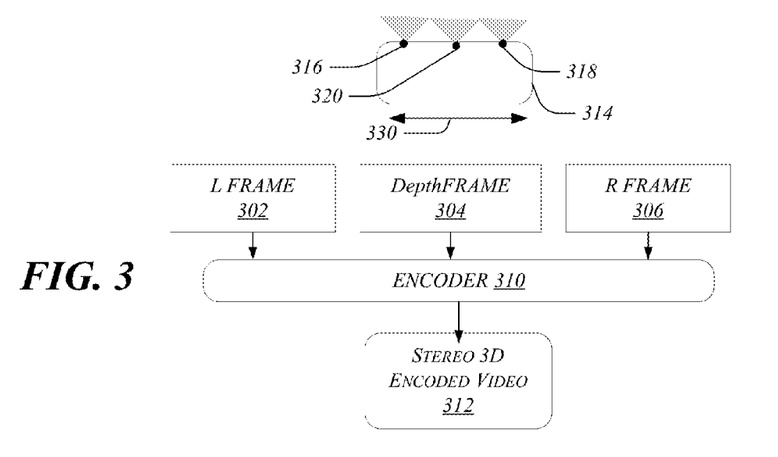
FIG. 3 depicts details of one embodiment for generating an encoded S3D video.

FIG. 3 depicts details of one embodiment for generating an encoded S3D video. As illustrated in FIG. 3 an encoded streaming 3D video frame may be constructed from a left frame, shown as L-frame 302, right frame, shown as R-frame 306, and a depth frame 304. In the present embodiments a recording device 314 to record S3D video may include a left camera 316, right camera 318, and depth camera 320 that is located midway between left camera 316 and right camera 318. When an S3D video is recorded a two dimensional left image, two dimensional right image and two dimensional depth image are recorded simultaneously to generate a left frame, right frame, and depth frame for a given video frame. The physical displacement of left camera 316 and right camera 318 with respect to one another result in an image of the same scene that is recorded in L-frame 302 being displaced along the axis 330 with respect to an image recorded in R-frame 306. The depth camera 320 may be a conventional depth recording component such as a combination of an infrared projector to project infrared radiation onto a scene and CMOS sensor to record reflected radiation as object depth. The embodiments are not limited in this context however.

Figure 4A:
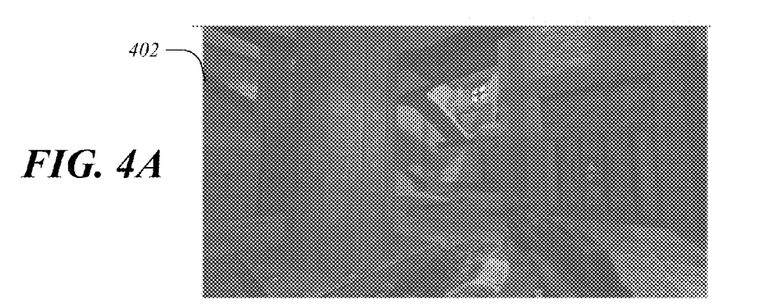
FIG. 4A presents an example image that illustrates presentation of an L-frame or R-frame of an S3D video frame as a two dimensional image.

The depth frame 304 may comprise a two dimensional array of depth values that present the object depth at pixel positions recorded in the L-frame 302 and R-frame 306. FIG. 4A presents an example image 402 that illustrates presentation of an L-frame or R-frame of an S3D video frame as a two dimensional image. The image 402 may represent one or more visual features associated with a set of two dimensional pixel positions in a video. For example, each pixel coordinate in an L-frame or R-frame may be associated with color and intensity information for that pixel coordinate. When presented on a display device, each L-frame or R-frame may thus present a complete image of a scene to be presented as in conventional S3D video. An offset or disparity between the R-frame and L-frame when presented on a display screen determines the depth of objects perceived by a viewer. In the present embodiments this disparity is determined from the depth frame of an S3D video frame as detailed below.

Figure 4B:
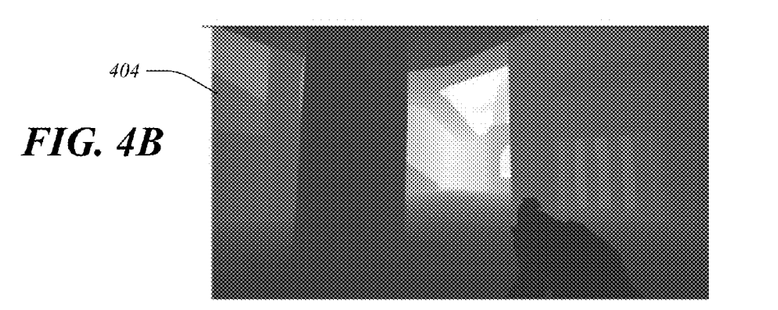
FIG. 4B presents a depth image that corresponds to the image of FIG. 4A.

The FIG. 4B presents a depth image 404 that corresponds to the image 402. In other words, the depth image 404 represents a two dimensional array of depth information for a scene that corresponds to the scene depicted in image 402.

For clarity of illustration, the depth information captured from a depth frame shown in depth image 404 is depicted in a format in which intensity is proportional to depth. Thus, in the depth image 404, the lighter regions represent objects that are at greater depths with respect to a viewer. This varying depth information may be used to vary the disparity between L-frame and R-frame at different pixel positions. Thus, for a given object at a given pixel position a depth frame, the larger the depth value associated with that object, the greater is the disparity between the pixel position of that object in the L-frame and pixel position of that object in the R-frame. Returning now to FIG. 3, the output of each of the L-frame 302, R-frame 306 and depth frame 304 is encoded by the encoder 310 to generate the S3D encoded video 312. As discussed in the following FIGS. this encoded video format that includes L-frame, R-frame and depth frame data may be harnessed to generate proper on-screen displacement between left and right images of an S3D video for presentation on a display device of any screen size.

Although in the example above the S3D encoded video 312 may be generated by a recording device, such as video recording device 204, in other embodiments an S3D encoded video may be computer-generated, such that L-frame, R-frame, and depth frame are all computer generated.

Figure 5A:
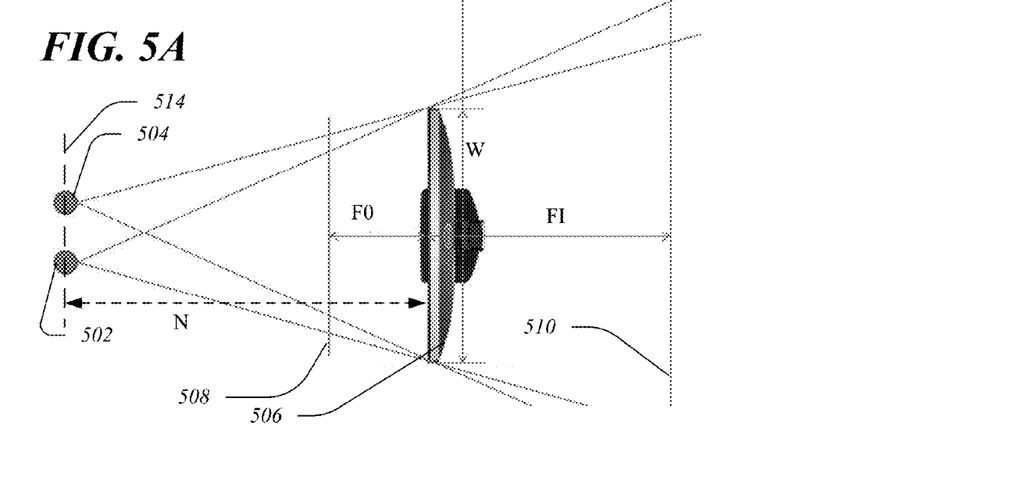
FIGS. 5A to 5C depict the geometrical relation of parameters involved in video processing consistent with the present embodiments.
Figure 5B:
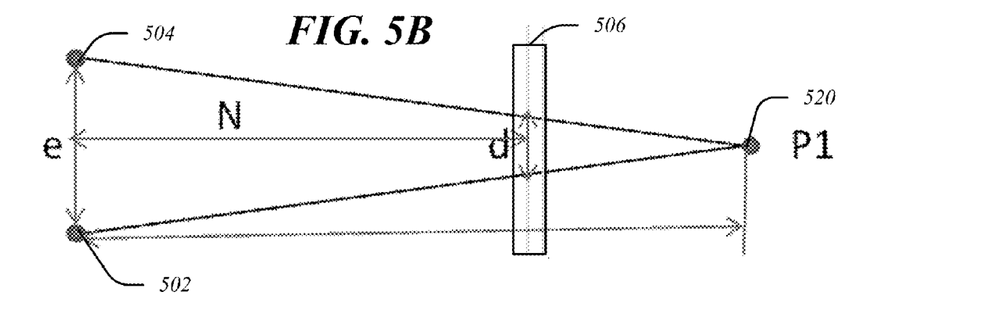
Figure 5C:
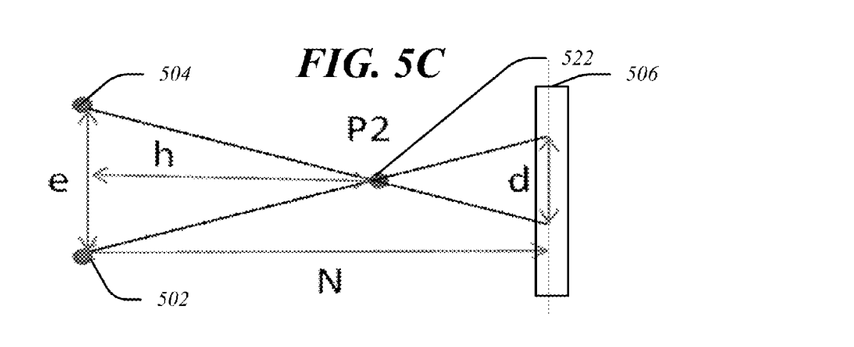

FIGS. 5A to 5C depict the geometrical relation of several parameters involved in device aware S3D video processing consistent with the present embodiments. In FIG. 5A, there is shown an arrangement in which viewer eyes 502, 504 are shown in relation to a display device 506. The display device 506 has a screen width W that lies along a direction parallel to a plane 514 in which the viewer left and right eyes 504, 502 are located. A value e is the distance between the viewer's eyes. For a given screen size it may be assumed that a viewer's eyes are located a distance N from the screen surface of display device 506 for proper viewing. For example N may be four meters for a 64 inch screen and 2 meters for a 32 inch screen. A desired object depth range for perceived depth of an objects lies between the lines 508 and 510. The perpendicular distance F0 from line 508 to screen surface of display device 506 represents the limits of a comfortable perceived depth for objects outside the screen surface. A perpendicular distance FI from line 510 to screen surface of display device 506 represents the limit of a comfortable perceived depth for objects inside the screen surface. The comfortable viewing range for objects presented by the display device 506 may lie is a zone between FI and FO, which zone is determined in part by the size of the screen of the display device. In some examples FI may equal 0.7 W and FO 0.4 W.

As noted, in stereo 3D displays, depth is perceived by disparities in the position of objects in left and right images that are provided to respective left and right eyes to produce a perceived three dimensional image. In order to generate the proper depth of an object, the disparity d between left and right images on a device screen is generated to either make the object appear in front of the screen (negative depth) or behind the screen (positive depth). Turning now to FIG. 5B there is shown the geometrical relationship between disparity d and location of an object P1 that is apparently located inside or behind the screen of display device 506. In this case a left image perceived by the left eye 504 is displaced outwardly toward the edge of display device 506 from a right image perceived by the right eye 502. This causes the location of object 520 to appear inside the screen at position P1. Turning now to FIG. 5C there is shown the geometrical relationship between disparity d and an object P2 that is apparently located outside the screen of display device 506. In this case a left image perceived by the left eye 504 is displaced inwardly toward from the edge of display device 506 with respect to a right image perceived by the right eye 502. The left and right images in such a scenario cross one another such that the left image is perceived to lie to the right of the right image, which is equivalent to the right image being perceived to lied to the left of the left image. This causes the location of object 520 to appear outside the screen at position P2. The location of an object with respect to the viewer is termed herein the perceived depth h.

It is straightforward from the geometry shown in FIGS. 5B and 5C using the principle of similar triangles to derive the relation between the perceived depth h and disparity d. In the scenario of FIG. 5B, the value of h is given by:

$$h = \frac{eN}{e-d}$$

while in FIG. 5C, $$h = \frac{eN}{e+d}.$$

Since e is constant for a given viewer and N is constant for a given display screen, once the disparity d is decided, the perceived depth is determined.

In order to produce the proper perceived depth of objects in an S3D video when presented on any target device, various embodiments employ device information of the target device as well as depth information received from the encoded S3D video to generate the proper disparity for the target device. Referring again to FIG. 2, in one implementation device aware decoder system 212 may perform an analysis to determine parameters related to presentation of an S3D video on a display device, such as the display device 224. For example, the device aware decoder component 220 may first retrieve or receive information regarding screen size including screen width W for the display device 224, as well as expected viewing distance N for viewers of the display device 224, and e, which may represent a determined average viewer eye separation.

In one implementation when a source frame of an encoded S3D video is received by the device aware decoder system 212, the frame may be decoded to generate an L-frame, R-frame and depth frame that constitute each video frame of the encoded S3D video as discussed above. In some implementations such as S3D video streaming, S3D video frames may be loaded when received into memory 216, which may include one or more buffers.

The pixels in the depth frame for each loaded S3D video frame may then be analyzed to determine the pixel position of pixel pairs in related L-frame and R-frame of the given S3D video frame. A pixel pair constitutes a designated pixel from an L-frame and a related pixel from an R-frame that contain the object data corresponding to a pixel position designated in the depth frame of that video frame. The depth frame may present a depth image that represents data collected from an intermediate position between images collected from left and right cameras that are stored in the respective left and right frames. Accordingly, the depth information for an object or portion of an object that is recorded at any pixel position of the depth frame may be used to determine the location of corresponding pixels in the left and right frames that record the same object or portion of an object. The pixel position of the object in the R-frame and L-frame are each are displaced from the pixel position of the depth frame due to the different location of the left, right, and depth cameras used to record the same object. For example, considering a frame pixel (x,y) of the depth frame, which may be located at any position in the depth frame, in order to convey depth the corresponding pixel $(x_L, y_L)$ in the L-frame may be displaced from the pixel position represented by the pixel (x,y) of depth frame by a disparity d in a first direction along the "x axis" and the corresponding pixel in the R-frame $(x_R, y_R)$ may be displaced by a disparity d in a second direction opposite the first direction along the x-axis. In particular, the coordinates of the corresponding L-frame pixel may be given by:

$$x_L = x\ d(x,y), y_L = y;$$

and the coordinates of the corresponding R-frame pixel may be given by:

$$x_R = x + d(x,y), \text{ and } y_R = Y.$$

In order to determine the value of d for a given pixel x,y in the depth frame being evaluated, it may be recalled that $$h = \frac{eN}{e-d} \text{ and } h = \frac{eN}{e+d}$$

for objects inside and outside the screen, respectively. Accordingly, the disparity is given by d=(N−)e/h or d=(h−N)e/h. The value of the perceived depth h for a given pixel (x,y) in turn is determined directly from the depth (x,y) value for the given pixel x,y of the depth frame according to h(x,y)=k*depth(x,y), where k is a constant. For example, the depth value in a depth frame may be provided based upon a reference or desired screen size to generate the proper perceived depth h. Moreover, the value of N and e may be predetermined for a given screen size as discussed above. Accordingly, the device aware decoder component 220 may load the depth value for the given pixel x,y, of the depth frame being processed, and apply the relevant values of k, N and e in order to determine d, in order to determine the coordinates for the pixel pair in the related L-frame and R-frame.

Figure 6:
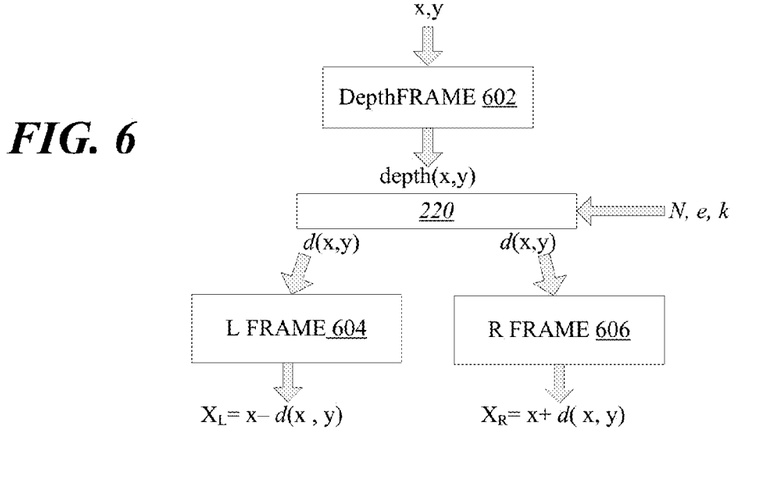
FIG. 6 depicts operations involved in determination of a pixel pair in a L-frame and R-frame consistent with the present embodiments.

The above procedure is highlighted in FIG. 6, which depicts operations involved in determination of a pixel pair in a L-frame and R-frame consistent with the present embodiments. As illustrated, an x, y pixel corresponding to the depth frame 602 is chosen for analysis. In the present embodiments, a series of x,y pixels that make up the depth frame 602 may be loaded in serial fashion to determine the related pixel pair in L-frame and R-frame for each x,y pixel. For a given x,y pixel, the depth (x,y) is retrieved by the device aware decoder component 220 from the depth value stored in the depth frame 602. The device aware decoder component 220 also receives the k, N and e values for the relevant depth values of the S3D video being decoded. Based upon these inputs, the device aware decoder component 220 calculates d(x,y) for the x,y pixel in question, which is applied to a corresponding pixel position in each of the L-frame and R-frame. This results in the generation of the relevant pixels of the pixel pair, given by $X_L = x\ d(x, y)$ and $X_R = x + d(x, y)$. Notably the corresponding y values of the pixels are not changed in the pixel pair.

In a subsequent operation, the device aware decoder component 220 may generate pixel pair positions for an offset L-frame and R-frame to be constructed from the S3D video being decoded so that the S3D video may be properly played on a target device. The pixel pair positions to be applied to the offset L-frame and R-frame based upon the viewing parameters of the target device. In particular, a target device disparity value may be calculated based upon a ratio of screen widths of a target device and reference device. For purposes of illustration it may be assumed that the reference screen width is W1 and target screen width is W2.

For given depth (x,y) that is read from a depth frame, the perceived depth for a reference screen may be represented by h1(x,y). The target screen width W2 is associated with an expected viewing distance N2, which may be determined for a target device as discussed above. Consistent with various embodiments, the ratio of perceived depth to target device screen width W2 may be maintained at the same value as perceived depth/screen width in a reference device. In particular, the perceived depth h2(x,y) may be determined from h2=h1(W2)/W1.

Following the procedure outline above for determining disparity from the perceived depth, the target device disparity d2 may be determined as d2=(h2−N2)e/h2 when h2 is greater than N2, that is when the perceived object depth places the object in question inside the target device screen. On the other hand, d2=(N2−h2)e/h2 when h2 is less than N2, that is when the perceived object depth places the object in question outside (in front of) the target device screen. Once the value of d2 is determined, pixel positions for a pixel pair may be calculated for an offset L-frame and offset R-frame to generate a video frame for presentation on the target device.

Figure 7:
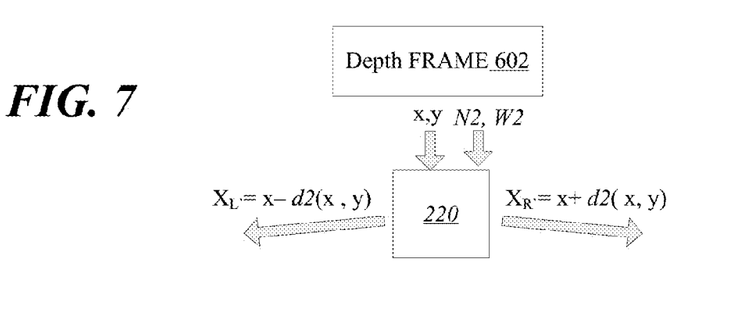
FIG. 7 illustrates an operation in which a pixel from a depth frame is received by a decoding component consistent with the present embodiments.

FIG. 7 illustrates operation of the above procedure in which a pixel x,y from a depth frame 602 is received by the device aware decoder component 220. The device aware decoder component 220 also uses the parameters N2 and W2 to determine h2 and d2. The value of d2 is then used to offset pixel positions in left and right offset frames. A pixel pair for a left offset pixel position $X_{L'}$ and right offset pixel position $X_{R'}$ are then determined according to:

$$X_{L'} = x\ d2(x,y)\ X_{R''} = x + d2(x,y).$$

Figure 8:
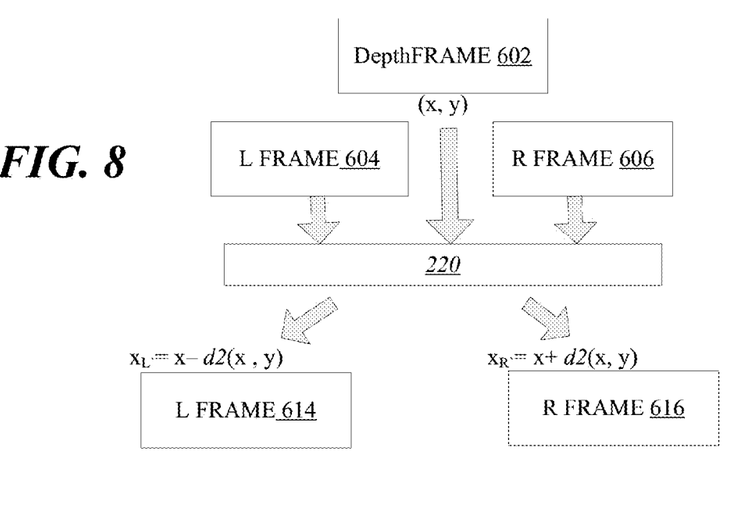
FIG. 8 shows generation of an L-frame and R-frame using a device aware decoder component.

In a subsequent operation the calculated left offset pixel position $X_{L'}$ and right offset pixel position $X_{R'}$ are used to generate an offset S3D video frame for presentation on the target device. An offset L-frame 614 and offset R-frame 616, respectively may be generated by applying these procedures. This is illustrated in FIG. 8, which shows generation of the L-frame 614 and R-frame 616 using the device aware decoder component 220. In this example, the matrix of x,y values that constitute the depth frame 602 are shown as x,y inputs received by the device aware decoder component 220. For each x,y pixel of the depth frame 602 a corresponding d(x,y) is calculated as discussed above, from which the target device disparity d2(x,y) is determined for each x,y pixel. This leads to generation of the L-frame 614 and R-frame 616 which may then be loaded for presentation as a single S3D video frame on the target device.

Once the L-frame 614 and R-frame 616 are generated the new S3D video frame may be analyzed to determine if any gaps exist at any pixel positions. If so, the pixel positions where gaps exist may be filled in with adjacent pixels. The resulting decoded S3D video frame presents an L-frame 614 and R-frame 616 in which the disparity d2 between pixels of a pixel pair for each pixel position is scaled in a manner that may generate a constant ratio of perceived depth/screen width for objects in the S3D video viewed on a target device in comparison to when the same S3D video is displayed on a reference (desired) device, which may have a larger or smaller screen width. This procedure may be applied repetitively in real time to decode a streaming S3D video as each successive S3D video frame is decoded for presentation on a target device.

Figure 9A:
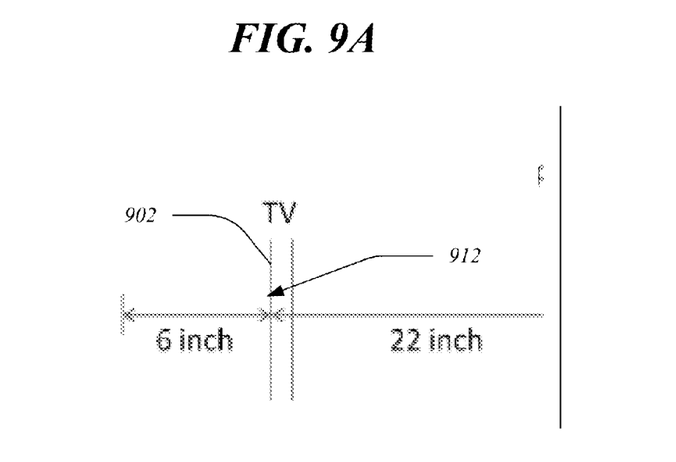
FIGS. 9A-9C detail the relation between perceived depth when an S3D video is presented on different devices.
Figure 9B:
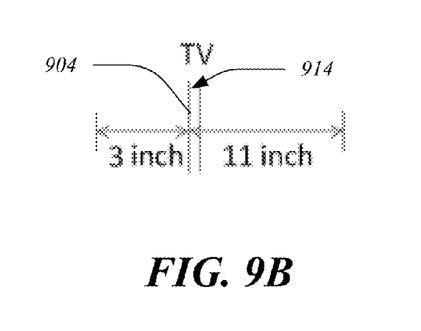

FIGS. 9A-9C highlight advantages provided by the present embodiments by detailing the relation between resulting perceived depth when an S3D video is presented on different devices. In FIG. 9A a reference device 902 may be assumed to have a screen size of 64 inches, which may represent screen width or screen diagonal. The expected viewing distance may be 4 m. The perceived depth range for objects of the S3D video for a viewer positioned to the left of reference device 902 is 22 inches behind the screen plane 912 (to the right) and 6 inches in front of the screen plane 612. FIG. 9B depicts a scenario in which the same S3D video is presented on a second device 904 having a 32 inch screen after processing by a device aware encoding component as generally described with respect to the above FIGS. It is assumed that the viewing distance is 2 m. Notably, the perceived depth range for objects of the S3D video for a viewer positioned to the left of second device 904 is 11 inches behind the screen plane 914 (to the right) and 3 inches in front of the screen plane 914. This range preserves a same perceived depth/screen width ratio as exhibited when the S3D video is presented on the reference device 902. Accordingly, a viewer of the second device 904 may have a similar experience when viewing the S3D video on the second device 904 as that of a viewer viewing the S3D video on the reference device 902 whose screen is double in size.

Figure 9C:
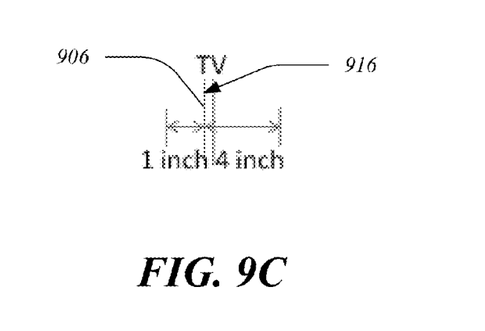

FIG. 9C presents a contrasting scenario in which the S3D video is presented on another device 906 that also has a 32 inch screen. In this case, the S3D video is decoded according to conventional procedures. In this example, the perceived depth range for objects of the S3D video for a viewer positioned to the left of device 906 is 4 inches behind the screen plane 916 (to the right) and 1 inch in front of the screen plane 916.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
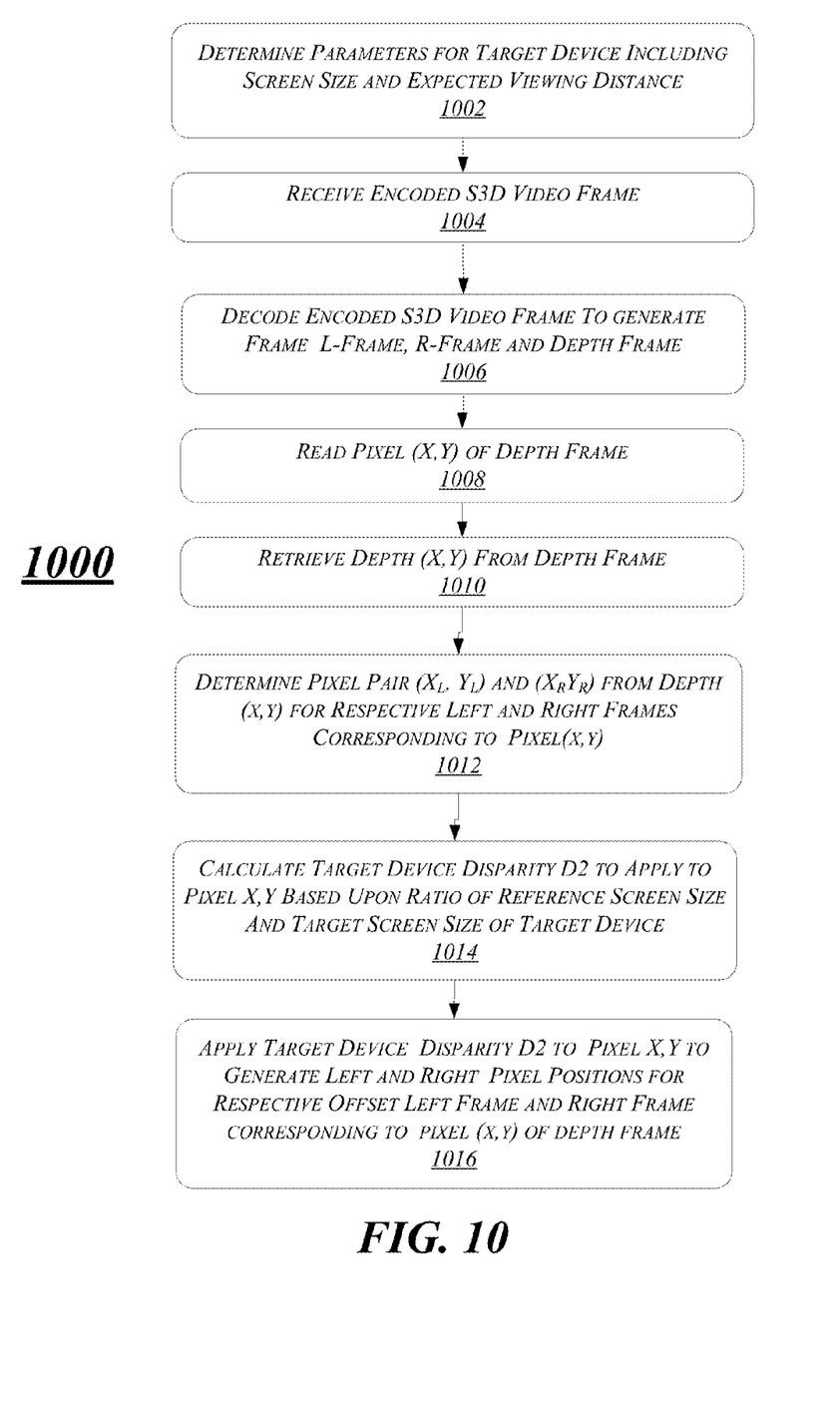
FIG. 10 shows an exemplary first logic flow.

FIG. 10 illustrates an exemplary first logic flow 1000. At block 1002 parameters for a target device to receive an S3D video are determined. The parameters may include screen size of the target device as well as expected viewing distance of a viewer watching the target device.

At block 1004 an encoded S3D video frame is received. The encoded S3D video frame may be a frame of an encoded S3D video that is being streamed to the target device.

At block 1006 the encoded S3D video frame is decoded. The decoding may generate an L-Frame, R-Frame, and a depth frame that includes depth information as a function of object position within the video frame.

At block 1008 a pixel (x,y) is read from the depth frame. The flow then proceeds to the block 1010 where a depth (x,y) is retrieved from the depth frame, which indicates a value of object depth for an object depicted at pixel (x,y). The depth value may be based upon a reference device parameters that include screen size and other parameters.

At block 1012, a pixel pair $(x_L, y_L)$ and $(x_R, y_R)$ is determined from the depth (x,y) value of pixel (x,y) for respective Left and Right frames corresponding to pixel (x,y) of the depth frame. The pixel pair may be determined based upon a calculated disparity applied to the pixel (x,y) where the disparity is determined from the depth (x,y) and reference device parameters.

At block 1014, a target device disparity d2 is calculated for to offset the pixel position of pixel (x,y) based upon a ratio of the reference screen size and target screen size of the target device.

At block 1016, the target device disparity d2 is applied to pixel(x,y) to generate left and right pixel positions for a respective offset left frame and offset right frame corresponding to the pixel (x,y) of the depth frame. The x coordinate of the left pixel position $X_L$ may be given as $X_{L'} = x - d2(x, y)$ and x coordinate of the right pixel position $X_R$ may be given as $X_{R'} = x + d2(x, y)$.

Figure 11:
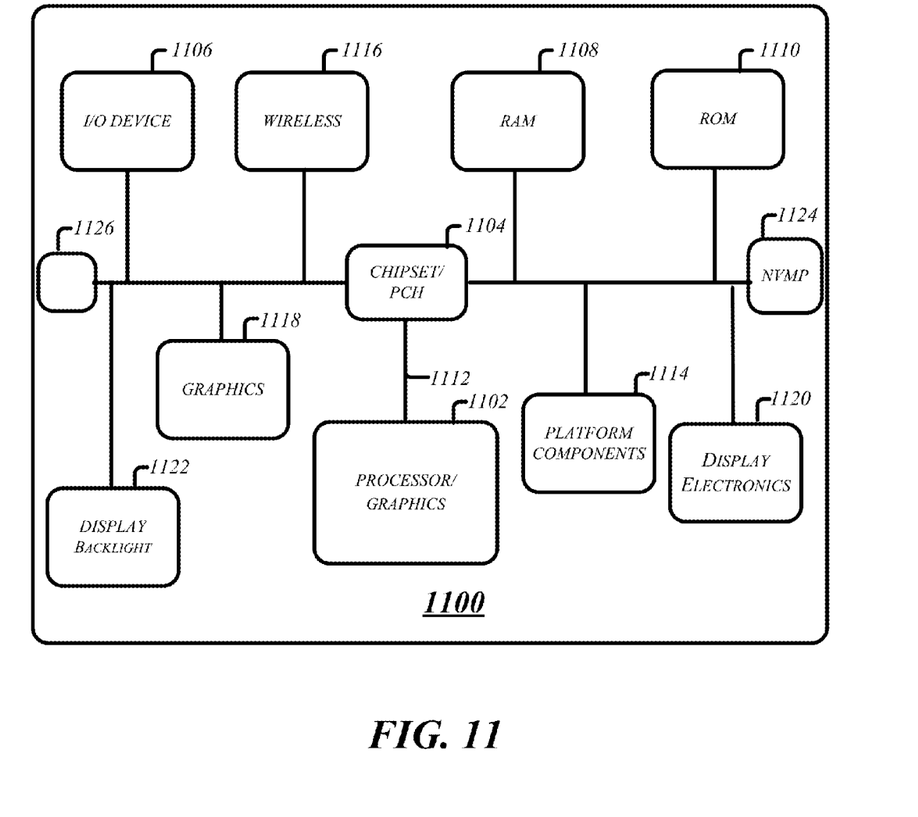
FIG. 11 illustrates an exemplary system architecture.

FIG. 11 is a diagram of an exemplary system embodiment and in particular, FIG. 11 is a diagram showing a system 1100, which may include various elements. For instance, FIG. 11 shows that system (platform) 1100 may include a processor/graphics core, termed herein processor 1102, a chipset/platform control hub (PCH), termed herein chipset 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 1116 and graphics device 1118, non-volatile memory port (NVMP) 1124, and antenna 1126. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores. Commands can be provided to processor 1102, for example, through keyboard, touch screen interaction, gestures, facial expressions, and sounds.

The following examples pertain to further embodiments.

In example 1, an apparatus for processing a stereo three dimensional video may include a memory to store a source frame of an encoded stereo three dimensional (S3D) video, the source frame configured for display on a reference device and comprising a left frame, a right frame, and a depth frame; a processor to retrieve a pixel (x,y), from the depth frame, the pixel (x,y) comprising a reference device depth(x,y); and a device aware decoder component to calculate a target device disparity for the pixel (x,y) based upon the reference device depth(x,y) and a screen width of a target device to present the S3D video.

In example 2, the device aware decoder component of example 1 may determine pixel pair positions in the source frame for a left pixel in the left frame and right pixel in the right frame based upon the reference device depth(x,y).

In example 3, the device aware decoder component of any of examples 1-2 may calculate for the pixel (x,y), a corresponding left pixel position for the left frame ($x_L$, $y_L$) and a right pixel position for the right frame ($x_R$, $y_R$), wherein $x_L$=x d(x, y), $y_L$=y, and wherein $x_R$=x+d(x, y), and $y_R$=y, wherein d is on screen disparity of an object to be displayed for the reference device.

In example 4, the device aware decoder component of any of examples 1-3 may read from the depth frame the reference device depth(x,y); calculate a perceived depth h for the pixel (x,y), according to h=reference device depth(x,y)*C, where C is a constant; and calculate d according to d=((h−N)e)/h for positive depth or d=((N−h)e)/h for negative depth, where N is a constant representing expected viewing distance for the reference screen, and e is a constant representing viewer eye separation.

In example 5, the device aware decoder component of any of examples 1-4 may apply the target device disparity to the pixel (x,y) to generate a set of target device pixel pair positions in a respective offset left frame and offset right frame.

In example 6, the device aware decoder component of any of examples 1-5 may: determine an expected viewing distance N2 for the target device, a screen width W2 and screen width W1 of the target and reference device, respectively; determine a perceived depth h2 for the target screen for the pixel x,y, wherein h2=hW2/W1; and calculate a target device disparity d2 according to: d2=((h2−N2)e)/h for positive depth or d2=((N2−h2)e)/h2 for negative depth.

In example 7, the set of target device pixel pair positions of any of examples 1-6 may comprise a left frame pixel $X_{LT}$ and right frame pixel $X_{RT}$=given by: $X_{LT}$=X d2(x, y), $Y_{LT}$=Y, and $X_{RT}$=x+d2(X, Y), and $Y_{RT}$=Y.

In example 8, the device aware decoder component of any of examples 1-7 may: determine a multiplicity of respective pixel pair positions for respective left pixels in the left frame and right pixels in the right frame based upon a multiplicity of respective frame pixels in the depth frame; calculate a respective multiplicity of target device disparities for the respective multiplicity of frame pixels; and apply the respective multiplicity of target device disparities to the respective frame pixels to generate a respective multiplicity of sets of target device pixel pair positions in the respective target left frame and target right frame.

In example 9, the device aware decoder component of any of examples 1-8 may perform a smoothing procedure by filling in a missing pixel in the offset left frame or right frame by adding pixel content to the mixing pixel from a respective adjacent pixel.

In example 10, the apparatus of any of examples 1-9 may comprise a display to present the S3D video, a network interface and radio.

Example 11 includes at least one computer-readable storage medium comprising instructions that, when executed, cause a system to: receive a source frame configured for display on a reference device comprising a left frame, right frame, and depth frame; read from the depth frame a pixel (x,y), to determine a reference device depth (x,y); and calculate a target device disparity for pixel (x,y) based upon the reference device depth(x,y) and a screen size of a target device to present the S3D video.

In example 12, the at least one computer-readable storage medium of example 11 may include instructions that, when executed, cause a system to apply the target device disparity to the pixel(x,y) to generate a set of target device pixel pair positions in a respective target left frame and target right frame.

In example 13, the at least one computer-readable storage medium of any of examples 11-12 may include instructions that, when executed, cause a system to determine pixel pair positions in the source frame for a left pixel in the left frame and right pixel in the right frame based upon the reference device depth(x,y).

In example 14, the at least one computer-readable storage medium of any of examples 11-13 may include instructions that, when executed, cause a system to calculate for a pixel (x,y) of the video frame, a corresponding left pixel position for the left frame ($x_L$, $y_L$) and a right pixel position for the right frame ($x_R$, $y_R$), wherein $x_L$=x d(x, y), $y_L$=y, and wherein $x_R$=x+d(x, y), and $y_R$=y, wherein d is onscreen disparity of an object to be displayed for the reference device.

In example 15, the at least one computer-readable storage medium of any of examples 11-14 may include instructions that, when executed, cause a system to: calculate a perceived depth h for a reference screen corresponding to depth (x,y) according to h=C depth (x,y) where C is a constant; and calculate d according to d=((h−N)e)/h for positive depth or d=((N−h)e)/h for negative depth, where N is a constant representing expected viewing distance for the reference screen, and e is a constant representing viewer eye separation.

In example 16, the at least one computer-readable storage medium of any of examples 11-15 may include instructions that, when executed, cause a system to: determine an expected viewing distance N2 for the target device, a screen width W2 and screen width W1 of the target and reference device; determine a perceived depth h2 for the target screen for the pixel x,y, wherein h2=hW2/W1; and calculate target device disparity d2 according to: d2=((h2−N2)e)/h for positive depth or d2=((N2−h2)e)/h2 for negative depth.

In example 17, the at least one computer-readable storage medium of any of examples 11-16 may include instructions that, when executed, cause a system to determine a left frame pixel $X_{LT}$ and right frame pixel $X_{RT}$ for the set of target pixel pair positions according to $X_{LT}$=X d2(x, y), $Y_{LT}$=Y, and $X_{RT}$=x+d2(X, Y), and $Y_{RT}$=Y.

In example 18, the at least one computer-readable storage medium of any of examples 11-17 may include instructions that, when executed, cause a system to: determine a multiplicity of respective pixel pair positions for respective left pixels in the left frame and right pixels in the right frame based upon a multiplicity of respective frame pixels in the depth frame; calculate a respective multiplicity of target device disparities for the respective multiplicity of frame pixels; and apply the respective multiplicity of target device disparities to the respective frame pixels to generate a respective multiplicity of sets of target device pixel pair positions in the respective target left frame and target right frame.

In example 19, a method of processing a three dimensional stereo video frame may include receiving a source frame configured for display on a reference device comprising a left frame, right frame, and depth frame; reading from the depth frame a pixel (x,y), to a the reference device depth (x,y); and calculating a target device disparity for pixel (x,y)

based upon the reference device depth(x,y) and a screen size of a target device to present the S3D video.

In example 20, the method of example 19 may include applying the target device disparity to the pixel(x,y) to generate a set of target device pixel pair positions in a respective target left frame and target right frame.

In example 21, the method of any of examples 19-20 may include determining pixel pair positions in the source frame for a left pixel in the left frame and right pixel in the right frame based upon the reference device depth(x,y).

In example 22, the determining the pixel pair positions for any of examples 19-21 may include calculating for a pixel (x,y) of the video frame, a corresponding left pixel position for the left frame $(x_L, y_L)$ and a right pixel position for the right frame $(x_R, y_R)$, wherein $x_L=x$ d(x, y), $y_L=y$, and wherein $x_R=x+d(x, y)$, and $y_R=y$, wherein d is onscreen disparity of an object to be displayed for the reference device.

In example 23, the method of any of examples 19-22 may include calculating a perceived depth h for a reference screen corresponding to depth (x,y) according to h=C depth (x,y) where C is a constant; and calculating d according to d=((h−N)e)/h for positive depth or d=((N−h)e)/h for negative depth, where N is a constant representing expected viewing distance for the reference screen, and e is a constant representing viewer eye separation.

In example 24, the method of any of examples 19-23 may include determining an expected viewing distance N2 for the target device, a screen width W2 and screen width W1 of the target and reference device; determining a perceived depth h2 for the target screen for the pixel x,y, wherein h2=hW2/W1; and calculating target device disparity d2 according to: d2=((h2−N2)e)/h for positive depth or d2=((N2−h2)e)/h2 for negative depth.

In example 25, the set of target device pixel pair positions of any of examples 19-24 may include a left frame pixel $X_{LT}$ and right frame pixel $X_{RT}$ given by $X_{LT}=X$ d2(x, y), $Y_{LT}=Y$, and $X_{RT}=x+d2(X, Y)$, and $Y_{RT}=Y$.

In example 26, the method of any of examples 19-25 may include determining a multiplicity of respective pixel pair positions for respective left pixels in the left frame and right pixels in the right frame based upon a multiplicity of respective frame pixels in the depth frame; calculating a respective multiplicity of target device disparities for the respective multiplicity of frame pixels; and applying the respective multiplicity of target device disparities to the respective frame pixels to generate a respective multiplicity of sets of target device pixel pair positions in the respective target left frame and target right frame.

Example 27 is user equipment to process stereo three dimensional video comprising means to perform the method of any of examples 19-26.

Example 28 is an apparatus to process stereo three dimensional video comprising means to perform the method of any one of examples 19-26.

In example 29, a video device to play a stereo three dimensional video may include a memory to store a source frame of an encoded stereo three dimensional (S3D) video, the source frame configured for display on a reference device and comprising a left frame, right frame, and depth frame; a processor to retrieve a pixel (x,y), from the depth frame, the pixel (x,y) comprising a reference device depth (x,y); a device aware decoder component to decode the S3D video by calculating a target device disparity for the pixel (x,y) based upon the reference device depth(x,y) and a target device screen width; and a digital display comprising the target device screen width to receive the decoded S3D video.

In example 30, the device aware decoder component of example 29 may determine pixel pair positions in the source frame for a left pixel in the left frame and right pixel in the right frame based upon the reference device depth(x,y).

In example 31, the device aware decoder component of any of examples 29-30 may: calculate for the pixel (x,y), a corresponding left pixel position for the left frame $(x_L, y_L)$ and a right pixel position for the right frame $(x_R, y_R)$, wherein $x_L=x$ d(x, y), $y_L=y$, and wherein $x_R=x+d(x, y)$, and $y_R=y$, wherein d is on screen disparity of an object to be displayed for the reference device.

In example 32, the device aware decoder component of any of examples 29-31 may: read from the depth frame the reference device depth(x,y); calculate a perceived depth h for the pixel (x,y), according to h=reference device depth (x,y)*C, where C is a constant; and calculate d according to d=((h−N)e)/h for positive depth or d=((N−h)e)/h for negative depth, where N is a constant representing expected viewing distance for the reference screen, and e is a constant representing viewer eye separation.

In example 33, the device aware decoder component of any of examples 29-32 may apply the target device disparity to the pixel (x,y) to generate a set of target device pixel pair positions in a respective offset left frame and offset right frame.

In example 34, the device aware decoder component of any of examples 29-33 may: determine an expected viewing distance N2 for the digital display, a screen width W2 and screen width W1 of the digital display and reference device, respectively; determine a perceived depth h2 for the target screen for the pixel x,y, wherein h2=hW2/W1; and calculate a target device disparity d2 according to: d2=((h2−N2)e)/h for positive depth or d2=((N2-h2)e)/h2 for negative depth.

In example 35, the set of target device pixel pair positions of any of examples 29-34 may include a left frame pixel $X_{LT}$ and right frame pixel $X_{RT}$ given by: $X_{LT}=X$ d2(x, y), $Y_{LT}=Y$, and $X_{RT}=x+d2(X, Y)$, and $Y_{RT}=Y$.

In example 36, the device aware decoder component of any of examples 29-35 may: determine a multiplicity of respective pixel pair positions for respective left pixels in the left frame and right pixels in the right frame based upon a multiplicity of respective frame pixels in the depth frame; calculate a respective multiplicity of target device disparities for the respective multiplicity of frame pixels; and apply the respective multiplicity of target device disparities to the respective frame pixels to generate a respective multiplicity of sets of target device pixel pair positions in the respective target left frame and target right frame.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus for processing a stereo three dimensional video, comprising:
a memory to store a source frame of an encoded stereo three dimensional (S3D) video, the source frame configured for display on a reference device and comprising a left frame, a right frame, and a depth frame;
a processor to retrieve a pixel (x,y), from the depth frame, the pixel (x,y) comprising a reference device depth(x, y); and
a device aware decoder component to calculate a target device disparity for the pixel (x,y) based upon the reference device depth(x,y) and a screen width of a target device to present the S3D video, and calculate for the pixel (x,y), a corresponding left pixel position for the left frame ($x_L$, $y_L$) and a right pixel position for the right frame ($x_R$, $y_R$), wherein $x_L=x-d(x,y)$, $y_L=y$, and wherein $x_R=x+d(x,y)$, and $y_R=y$, wherein d is on screen disparity of an object to be displayed for the reference device.

2. The apparatus of claim 1, the device aware decoder component to determine pixel pair positions in the source frame for a left pixel in the left frame and right pixel in the right frame based upon the reference device depth(x,y).

3. The apparatus of claim 1, the device aware decoder component to:
read from the depth frame the reference device depth(x,y);
calculate a perceived depth h for the pixel (x,y), according to h=reference device depth(x,y) *C, where C is a constant; and
calculate d according to d=((h−N)e)/h for positive depth or d=((N−h)e)/h for negative depth, where N is a constant representing expected viewing distance for the reference screen, and e is a constant representing viewer eye separation.

4. The apparatus of claim 1, the device aware decoder component to apply the target device disparity to the pixel (x,y) to generate a set of target device pixel pair positions in a respective offset left frame and offset right frame.

5. The apparatus of claim 4, the device aware decoder component to:
determine an expected viewing distance N2 for the target device, a screen width W2 and screen width W1 of the target and reference device, respectively;
determine a perceived depth h2 for the target screen for the pixel x,y, wherein h2=hW2/W1; and
calculate a target device disparity d2 according to:

$$d2=((h2-N2)e)/h \text{ for positive depth or}$$

$$d2=((N2-h2)e)/h2 \text{ for negative depth.}$$

6. The apparatus of claim 5, the set of target device pixel pair positions comprising a left frame pixel $X_{LT}$ and right frame pixel $X_{RT}$=given by:

$$X_{LT}=X-d2(x,y), Y_{LT}=Y, \text{ and}$$

$$X_{RT}=x+d2(X,Y), \text{ and } Y_{RT}=Y.$$

7. The apparatus of claim 1, the device aware decoder component to:
determine a multiplicity of respective pixel pair positions for respective left pixels in the left frame and right pixels in the right frame based upon a multiplicity of respective frame pixels in the depth frame;
calculate a respective multiplicity of target device disparities for the respective multiplicity of frame pixels; and
apply the respective multiplicity of target device disparities to the respective frame pixels to generate a respective multiplicity of sets of target device pixel pair positions in the respective target left frame and target right frame.

8. The apparatus of claim 1, the device aware decoder component to perform a smoothing procedure by filling in a missing pixel in the offset left frame or right frame by adding pixel content to the mixing pixel from a respective adjacent pixel.

9. The apparatus of claim 1, comprising a display to present the S3D video, a network interface and radio.

10. At least one non-transitory computer-readable storage medium comprising instructions that, when executed, cause a system to:
receive a source frame configured for display on a reference device comprising a left frame, right frame, and depth frame;
read from the depth frame a pixel (x,y), to determine a reference device depth (x,y);
calculate a target device disparity for pixel (x,y) based upon the reference device depth(x,y) and a screen size of a target device to present the S3D video; and
calculate for a pixel (x,y) of the video frame, a corresponding left pixel position for the left frame $(x_L, y_L)$ and a right pixel position for the right frame $(x_R, y_R)$, wherein $x_L=x-d(x, y)$, $y_L=y$, and wherein $x_R=x+d(x, y)$, and $y_R=y$, wherein d is onscreen disparity of an object to be displayed for the reference device.

11. The at least one non-transitory computer-readable storage medium of claim 10, comprising instructions that, when executed, cause a system to apply the target device disparity to the pixel(x,y) to generate a set of target device pixel pair positions in a respective target left frame and target right frame.

12. The at least one non-transitory computer-readable storage medium of claim 10, comprising instructions that, when executed, cause a system to determine pixel pair positions in the source frame for a left pixel in the left frame and right pixel in the right frame based upon the reference device depth(x,y).

13. The at least one computer-readable storage medium of claim 10, comprising instructions that, when executed, cause a system to:
calculate a perceived depth h for a reference screen corresponding to depth (x,y) according to h=C depth (x,y) where C is a constant; and
calculate d according to d=((h−N)e)/h for positive depth or d=((N−h)e)/h for negative depth, where N is a constant representing expected viewing distance for the reference screen, and e is a constant representing viewer eye separation.

14. The at least one non-transitory computer-readable storage medium of claim 13, comprising instructions that, when executed, cause a system to:
determine an expected viewing distance N2 for the target device, a screen width W2 and screen width W1 of the target and reference device;
determine a perceived depth h2 for the target screen for the pixel x,y, wherein h2=hW2/W1; and
calculate target device disparity d2 according to:

$d2=((h2-N2)e)/h$ for positive depth or $d2=((N2-h2)e)/h2$ for negative depth.

15. The at least one non-transitory computer-readable storage medium of claim 14, comprising instructions that, when executed, cause a system to determine a left frame pixel $X_{LT}$ and right frame pixel $X_{RT}$ for the set of target pixel pair positions according to $X_{LT}=X-d2(x,y)$, $Y_{LT}=Y$, and $X_{RT}=x+d2(X,Y)$, and $Y_{RT}=Y$.

16. The at least one non-transitory computer-readable storage medium of claim 10, comprising instructions that, when executed, cause a system to:
determine a multiplicity of respective pixel pair positions for respective left pixels in the left frame and right pixels in the right frame based upon a multiplicity of respective frame pixels in the depth frame;
calculate a respective multiplicity of target device disparities for the respective multiplicity of frame pixels; and
apply the respective multiplicity of target device disparities to the respective frame pixels to generate a respective multiplicity of sets of target device pixel pair positions in the respective target left frame and target right frame.

17. A method of processing a three dimensional stereo video frame, comprising:
receiving a source frame configured for display on a reference device comprising a left frame, right frame, and depth frame;
reading from the depth frame a pixel (x,y), to a the reference device depth (x,y);
calculating a target device disparity for pixel (x,y) based upon the reference device depth(x,y) and a screen size of a target device to present the S3D video; and
calculating for a pixel (x,y) of the video frame, a corresponding left pixel position for the left frame $(x_L, Y_L)$ and a right pixel position for the right frame $(x_R, y_R)$, wherein $x_L=x-d(x, y)$, $y_L=y$, and wherein $x_R=x+d(x, y)$, and $y_R=y$, wherein d is onscreen disparity of an object to be displayed for the reference device.

18. The method of claim 17, comprising:
applying the target device disparity to the pixel(x,y) to generate a set of target device pixel pair positions in a respective target left frame and target right frame.

19. The method of claim 17, comprising:
determining pixel pair positions in the source frame for a left pixel in the left frame and right pixel in the right frame based upon the reference device depth(x,y).

20. The method of claim 17, comprising:
calculating a perceived depth h for a reference screen corresponding to depth (x,y) according to h=C depth (x,y) where C is a constant; and
calculating d according to d=((h−N)e)/h for positive depth or d=((N−h)e)/h for negative depth, where N is a constant representing expected viewing distance for the reference screen, and e is a constant representing viewer eye separation.

21. The method of claim 20, comprising:
determining an expected viewing distance N2 for the target device, a screen width W2 and screen width W1 of the target and reference device;
determining a perceived depth h2 for the target screen for the pixel x,y, wherein h2=hW2/W1; and
calculating target device disparity d2 according to:

$d2=((h2-N2)e)/h$ for positive depth or $d2=((N2-h2)e)/h2$ for negative depth.

22. The method of claim 21, the set of target device pixel pair positions comprising a left frame pixel $X_{LT}$ and right frame pixel $X_{RT}$ given by $X_{LT}=X-d2(x,y)$, $Y_{LT}=Y$, and $X_{RT}=x+d2(X,Y)$, and $Y_{RT}=Y$.

* * * * *